Dec. 16, 1958 H. V. WAIT 2,864,148
SAFETY COLLAR
Filed Jan. 28, 1957
2 Sheets-Sheet 1
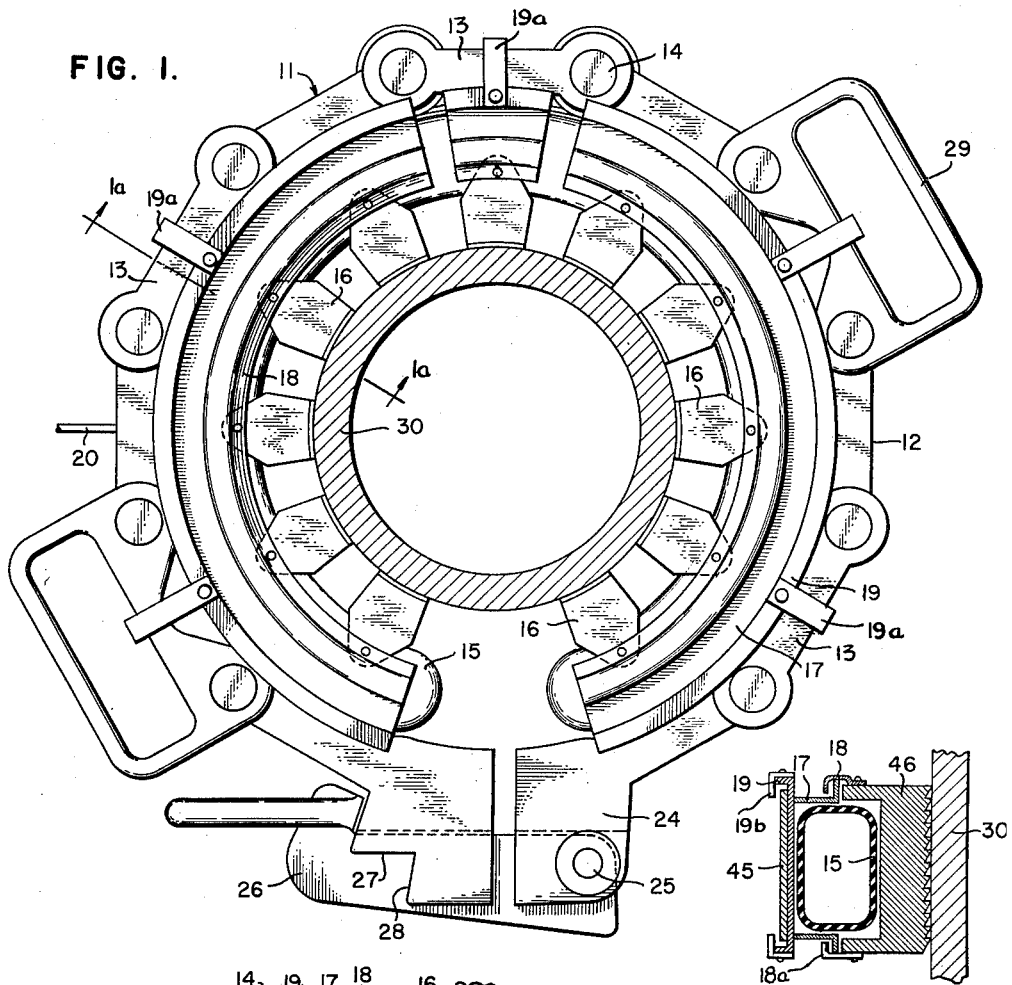
FIG. 1.
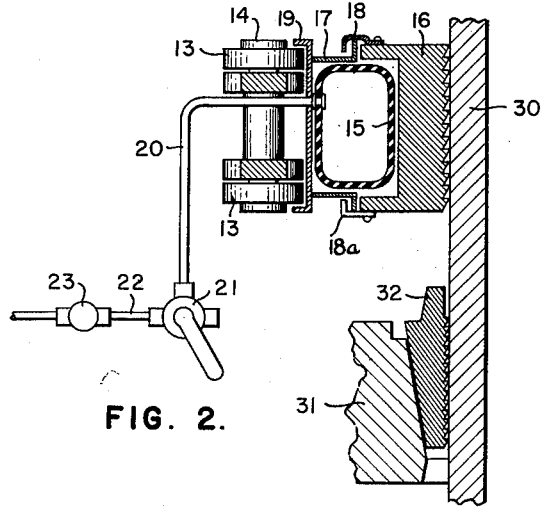
FIG. 2.
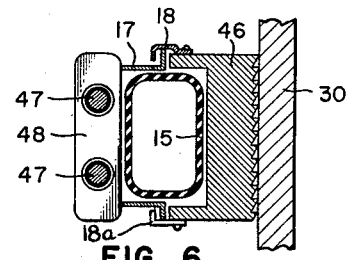
FIG. 5.
FIG. 6.
INVENTOR.
Harold V. Wait,
BY
ATTORNEY.

Dec. 16, 1958     H. V. WAIT     2,864,148
SAFETY COLLAR

Filed Jan. 28, 1957     2 Sheets-Sheet 2

*INVENTOR.*
Harold V. Wait,
BY
ATTORNEY.

United States Patent Office 2,864,148
Patented Dec. 16, 1958

2,864,148

SAFETY COLLAR

Harold V. Wait, New Orleans, La., assignor, by mesne assignments, to Jersey Production Research Company, Tulsa, Okla., a corporation of Delaware Application January 28, 1957, Serial No. 636,575

11 Claims. (Cl. 24—263)

The present invention is directed to a safety collar. More particularly the invention is directed to a safety collar which is clamped on drill collars, flush joint pipe, drill pipe, and tubing having a uniform cylindrical surface or diameter. In its more specific aspects the invention is directed to a safety collar which is easily affixed on the periphery of pipe and the like.

The present invention may be briefly described as a safety collar for attachment to and around pipe having a uniform cylindrical surface. The safety collar comprises a flexible supporting member having or arranged thereon a plurality of pipe gripping members which are carried by the supporting member for engagement with the periphery of pipe in pipe gripping relationship. A fluid pressure operated means such as a tubular expansible member is carried by the supporting member in operative relationship with the pipe gripping member for placing or forcing the pipe gripping members into pipe gripping engagement. The supporting member is provided with means for latching the supporting member around the periphery of pipe. The supporting member suitably may comprise a plurality of interconnected link members which give flexibility to the supporting member or the supporting member may be a flexible metal band or at least one cable member or at least one chain member. Preferably the supporting member comprises a plurality of interconnected link members.

The use of the safety collar of the present invention eliminates a number of serious disadvantages inherent in the usual practices of handling drill collars. For example, in order to avoid loss of drill collars into the borehole, it has been common practice to attach to the drill collar a toothed clamp such as the safety clamp or collar shown in the composite catalog of Oil Field and Pipeline Equipment, 19th edition, 1951, published by Gulf Publishing Company, Houston, Texas, at page 420. A toothed clamp is attached above the slips in order to provide pressure on top of the tapered slips in case the slips tend to release their grip at the time strain is being applied thereto. Not only is much time consumed in setting and tightening this prior art clamp but it may fail to hold if it is applied at an angle while being tightened in place.

Another difficulty inherent in the modern drill collar comes about because of the manner in which it is made. The modern drill collar is a uniform cylinder of hardened steel with screw threads at both ends. Because it is of uniform diameter throughout its outer length it possesses no shoulder of enlarged diameter which can be relied upon to strike the upper surface of the tapered slips and cause the slips to reset in case the slips momentarily release their grip on the drill collar.

The safety collar or clamp of the present invention is easily applied around the periphery of pipe and drill collars and its construction allows it to adapt itself readily to the outer contours of the pipe.

The present invention will be further illustrated by reference to the drawing in which Fig. 1 is a top view looking down on a preferred embodiment;

Fig. 2 is a view in section of the safety collar with its attendant fluid pressure means;

Fig. 5 shows a modified supporting means for the safety collar;

Fig. 6 shows a still further modification of a flexible supporting means for the safety collar.

Figure 1A:
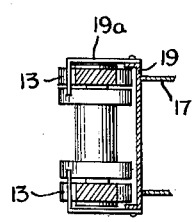
Fig. 1a is a partial sectional view taken along the lines 1a—1a of Fig. 1.

Referring now to the drawing and particularly to Figs. 1 and 2, numeral 11 designates a safety collar comprised of a supporting member illustrated by the numeral 12 and made up of a plurality of links 13 interconnected by pin members 14. Arranged within and supported by the supporting member 12 is an expansible member such as a tubing 15. A plurality of slip members 16 are operatively engaged with the tubular member 15. A shroud member 17 is interconnected with the slip members 16 by means of brackets 18 and 18a which provide a sliding fit between the supporting member 12 and the slip members 16. Brackets 18 and 18a are attached to slip members 16 as shown. It is to be noted that the shroud 17 is interconnected by bracket 19a to the supporting member 12 which is provided with a housing 19 which serves to enclose the plurality of link members 13 to form the supporting member 12, the bracket 19a being attached to housing 19 as shown.

Connected to the tubular member 15 is a conduit 20 which is connected in turn to a control valve 21. In turn the control valve 21 is connected by a conduit 22 to a source of fluid pressure such as air. The conduit 22 may be suitably provided with a pressure control valve 23 to adjust or reduce the pressure of the air supplied by conduit 22 and 20 to the tubular member 15 to a predetermined selected pressure.

Supporting member 12 is provided with a safety latch 24 to which is pivotally attached by pin member 25 a door member 26 which is designed to engage with the surfaces 27 and 28 of the latch 24.

The supporting member 12 is provided with handles 29 for placement of the structure around the periphery of pipe such as a drill collar 30.

Referring to Fig. 2, it will be seen that the device of Fig. 1 is placed around the periphery of the drill collar 30 which is arranged in a rotary table 31 and is supported thereby by the conventional slips 32. If the slips 32 should fail for any reason the safety collar 11 will prevent the pipe and the drill collar arranged therein from falling down within the borehole.

The device of the present invention is latched around the periphery of pipe or drill collar 30 and air pressure is applied to the tubular member 15 which expands the slips 16 into pipe gripping relationship with the periphery of the drill collar 30 causing the surfaces of the slips to bite into the surface of the drill collar and hold the drill collar in case the slips 32 should become disengaged and force the slips 32 back into supporting engagement.

Figure 3:
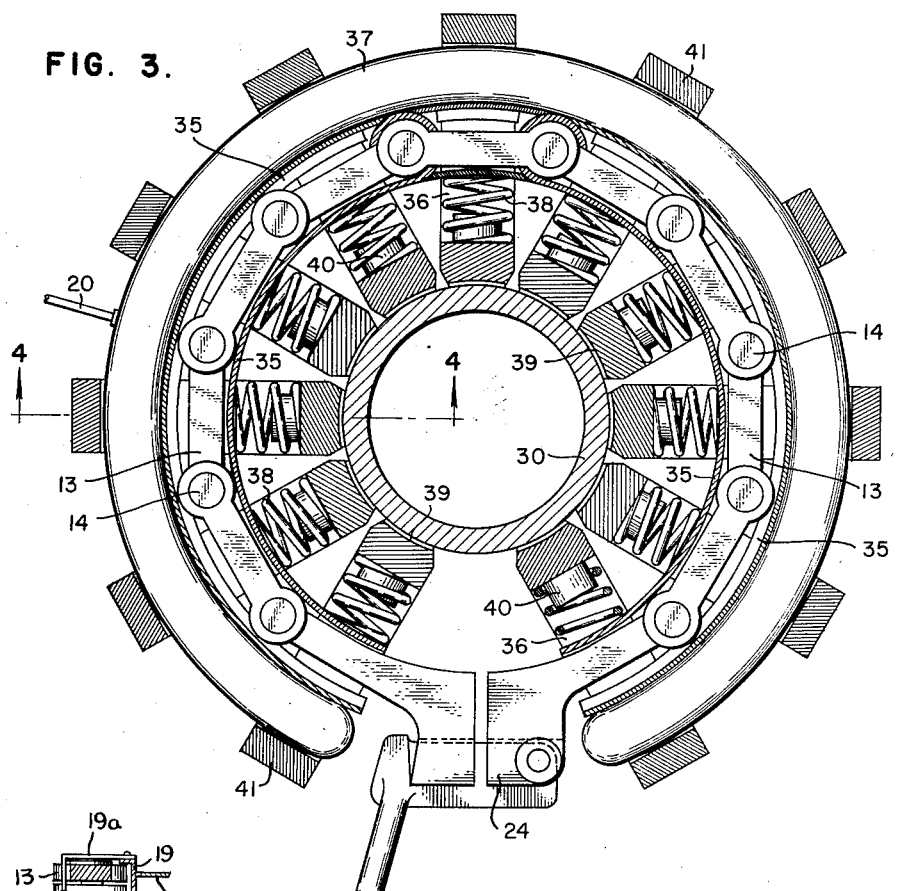
Fig. 3 is a view similar to Fig. 1 of a modification thereof.
Figure 4:
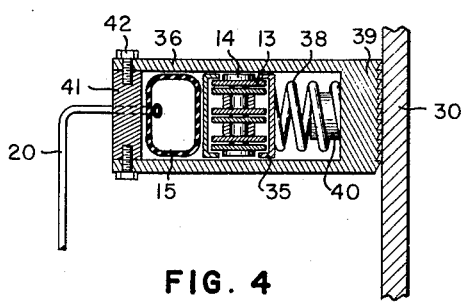
Fig. 4 is a view in partial section of the apparatus of Fig. 3.

Referring now to Figs. 3 and 4 a supporting member of the nature described in Figs. 1 and 2 is provided with a flexible link assembly 12 consisting of links 13 which are interconnected by pins 14. In this particular instance the link assembly 12 is arranged in a housing 35. Arranged about the outer periphery of housing 35 is a tubular expansion member 37. Encasing both tubular member 37 and housing 35 are a plurality of yoke members 36. Yoke members 36 are provided with pipe gripping ends 39. A biasing member such as a spring member 38 is positioned within each of the yoke members 36 with one end biasing against the end 39 and the other end biasing against the inner periphery of housing 35. The springs 38 are retained within yoke members 36 by cylindrical knobs or projections 40. The back or outer end of each of the yoke members 36 are closed by a plate member 41 which is secured by bolts 42. The ends of link assembly 12 are releasably secured together by latch 24.

The device of Figs. 3 and 4 is adapted to be arranged about the outer periphery of a drill collar or pipe 30 for gripping same.

The modification as shown in Figs. 3 and 4 works somewhat different from the device of Figs. 1 and 2 in that pressure is applied to tubular member 37 to release the pipe engaging ends 39 from the pipe. As can be seen when pressure is applied to tubular member 37 the outer ends of the yoke members 36 are biased outwardly away from housing 35 which in turn compresses springs 38. This naturally pulls the pipe gripping ends 39 away from the pipe thereby releasing them from gripping contact. In order to grip the pipe the entire assembly is encircled about the pipe 30 and the tubular member 37 inflated. The ends of the link assembly 12 are pulled together and latched by latch 24 whereupon pressure is released from tubular member 37. The springs 38 then take over and press the pipe gripping ends 39 into gripping engagement with the pipe 30.

If it is desired to release the assembly of Figs. 3 and 4 from the pipe 30 the tubular member is again inflated by pressure. This comprises springs 38 and pulls the ends 39 of yoke members 36 away from the pipe.

Referring to Fig. 5, it will be seen that the links 13 and pins 14 of Figs. 1 to 4 have been modified and replaced by a band spring such as 45. Pipe slips such as 46 are slidably arranged in bracket members such as 18, 18a and 19b in relationship to a shroud 17 and 19 as shown in Figs. 1 and 2. The remainder of the structure of Fig. 5 is similar to that of Figs. 1 and 2.

In Fig. 6 instead of a band spring such as 45 the supporting means comprises a plurality of cables such as 47, slidably arranged through cable alignment members 48 with the other structure being similar to that described in Figs. 1, 2 and 5.

Figure 7:
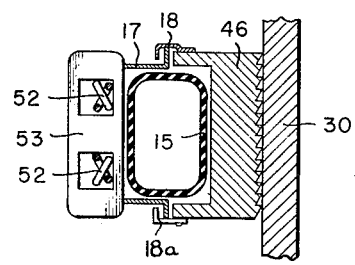
Fig. 7 is a still further modification of the flexible supporting means.

In Fig. 7 the cables 47 have been replaced by chains 52 slidably arranged through alignment members 53.

The present invention is quite advantageous and useful in that by providing a flexible member the safety collar is easily clamped around the periphery of uniform surface pipe and the like. Furthermore, it is advantageous and useful in that the structure is simple in nature and is easily handled on the floor of a derrick requiring no particular extra equipment. By virtue of the fluid pressure operated means it is possible to clamp the structure of the present invention easily and rapidly around the periphery of pipe. The device of the present invention by virtue of the flexible supporting member may be easily hung or stored as desired on or adjacent the derrick floor.

The nature and objects of the present invention having been completely described and illustrated, what I wish to claim as new and useful and to secure by Letters Patent is:

1. A safety collar for attachment to pipe having a unifor cylindrical surface which comprises a flexible supporting member, a plurality of pipe gripping members carried by said supporting member for engagement with the periphery of pipe in pipe gripping relationship, fluid pressure operated means, said fluid pressure operated means being carried by said supporting member operatively engaging said pipe gripping members such that on imposing fluid pressure on said fluid pressure operated means said pipe gripping members are caused to move relative to said supporting member, and means for latching said supporting member around the periphery of pipe.

2. A safety collar in accordance with claim 1 in which the supporting member comprises a plurality of interconnected link members.

3. A safety collar in accordance with claim 1 in which the supporting member comprises a flexible metal band.

4. A safety collar in accordance with claim 1 in which the supporting member comprises at least one cable member.

5. A safety collar in accordance with claim 1 in which the supporting member comprises at least one chain member.

6. A safety collar for attachment to pipe having a uniform cylindrical surface which comprises a flexible supporting member, a plurality of pipe gripping members carried by said supporting member for engagement with the periphery of pipe in pipe gripping relationship, a fluid pressure operated expansible member, said expansible member being carried interiorly by said supporting member operatively engaging said pipe gripping members such that on imposing fluid pressure on said expansible member said pipe gripping members are caused to move toward said pipe, and means for latching said supporting member around the periphery of pipe.

7. A safety collar for attachment to pipe having a uniform cylindrical surface which comprises a flexible supporting member, a plurality of pipe gripping members carried by said supporting member for engagement with the periphery of pipe in pipe gripping relationship, a fluid pressure operated expansible member, said expansible member being carrier exteriorly by said supporting member operatively engaging said pipe gripping members such that on imposing fluid pressure on said expansible member said pipe gripping members are caused to move away from said pipe, and means for latching said supporting member around the periphery of pipe.

8. A safety collar for attachment to pipe having a uniform cylindrical surface which comprises a flexible supporting member, a plurality of pipe gripping members carried by said supporting member for engagement with the periphery of pipe in pipe gripping relationship, a fluid pressure operated expansible tubular member, said tubular member being carried by said supporting member operatively engaging said pipe gripping members such that on imposing fluid pressure on said tubular member said pipe gripping members are caused to move relative to said supporting member, means for supplying fluid pressure to said tubular member, and means for latching said supporting member around the periphery of pipe.

9. A safety collar for attachment to pipe having a uniform cylindrical surface which comprises a flexible supporting member, a plurality of yoke members carried by said supporting member, said yoke members each having a pipe gripping member for engagement with the periphery of pipe in pipe gripping relationship, fluid pressure operated means carried by said yoke members for placing said collar around said pipe, biasing means in said yoke member, slidable means arranged in said yoke members intermediate the biasing means and the fluid pressure operated means interconnecting said yoke members and said flexible member, said fluid pressure means compressing said biasing means on application of pressure to said fluid pressure means and thereby pulling said pipe gripping members from pipe engagement, said biasing means normally forcing said pipe gripping members into engagement with the periphery of said pipe, and means for latching said supporting member around the periphery of pipe, said biasing means causing said pipe gripping members to engage with the pipe on release of pressure from said fluid pressure means.

10. A safety collar for attachment to pipe having a uniform cylindrical surface which comprises a flexible supporting member comprising a plurality of interconnected links, a plurality of pipe gripping members carried by said supporting member for engagement with the periphery of pipe in pipe gripping relationship, a fluid pressure operated expansible tubular member, said tubular member being carried by said supporting member in operative relationship with said pipe gripping members such that on imposing fluid pressure on said tubular member said pipe gripping members are caused to move relative to said supporting members, a conduit connected to said tubular member for supplying fluid under pressure for expanding said tubular member, means in said conduit for releasing fluid pressure from said tubular member, and means for latching said supporting member around the periphery of pipe.

11. A safety collar in accordance with claim 9 in which the supporting member comprises a plurality of interconnected link members.

References Cited in the file of this patent

UNITED STATES PATENTS

| | | |
|---|---|---|
| 1,860,062 | Taylor | May 24, 1932 |
| 2,109,546 | McLagan | Mar. 1, 1938 |
| 2,231,923 | Koen | Feb. 18, 1941 |